United States Patent
Cottrell

(10) Patent No.: US 9,357,715 B2
(45) Date of Patent: Jun. 7, 2016

(54) VERTICAL PLANTER

(71) Applicant: Brian Cottrell, Redondo Beach, CA (US)

(72) Inventor: Brian Cottrell, Redondo Beach, CA (US)

( * ) Notice: Subject to any disclaimer, the term of this patent is extended or adjusted under 35 U.S.C. 154(b) by 44 days.

(21) Appl. No.: 14/267,703

(22) Filed: May 1, 2014

(65) Prior Publication Data

US 2015/0313104 A1 Nov. 5, 2015

(51) Int. Cl.
| | |
|---|---|
| *A01G 31/00* | (2006.01) |
| *A01G 9/02* | (2006.01) |
| *A01G 31/06* | (2006.01) |
| *A01G 1/00* | (2006.01) |

(52) U.S. Cl.
CPC ............... *A01G 9/022* (2013.01); *A01G 1/001* (2013.01); *A01G 31/06* (2013.01)

(58) Field of Classification Search
CPC ....... A01G 31/00; A01G 31/06; A01G 1/001; A01G 9/022
USPC .................................................. 47/62, 62 A
See application file for complete search history.

(56) References Cited

U.S. PATENT DOCUMENTS

| | | | | |
|---|---|---|---|---|
| 5,136,804 | A * | 8/1992 | Rothem et al. ..................... | 47/60 |
| 5,555,676 | A * | 9/1996 | Lund .................................. | 47/82 |
| 5,724,768 | A * | 3/1998 | Ammann, Jr. ................ | 47/62 A |
| 5,937,575 | A * | 8/1999 | Zobel et al. .................... | 47/62 A |
| 7,531,350 | B2 * | 5/2009 | Shiau ..................... | C12M 21/16 435/292.1 |
| 8,225,549 | B2 * | 7/2012 | Simmons ...................... | 47/62 N |
| 8,250,809 | B2 * | 8/2012 | Simmons ...................... | 47/62 N |
| 8,484,890 | B2 * | 7/2013 | Simmons ...................... | 47/62 A |
| 2009/0293357 | A1 * | 12/2009 | Vickers .................. | A01G 31/02 47/62 A |
| 2014/0000162 | A1 * | 1/2014 | Blank ..................... | A01G 31/06 47/62 A |
| 2015/0334930 | A1 * | 11/2015 | Stoltzfus ................ | A01G 31/06 47/62 A |

\* cited by examiner

*Primary Examiner* — Kristen C Hayes
*Assistant Examiner* — Ebony Evans

(57) ABSTRACT

A self contained decorative planter for cultivating and displaying plants that comprises; a power supply, a hollow structure for accepting plants oriented with the root or base of the plant facing the inside of the structure, a reservoir in contact with an ultrasonic transducer for producing a water or nutrient vapor to distribute throughout the inside of the hollow structure, and a lighting system in which light is directed towards the outside surface of the structure. The hollow structure may take on wide range of decorative shapes with plants artistically arranged throughout with the leaf or flower portions oriented outward.

4 Claims, 4 Drawing Sheets

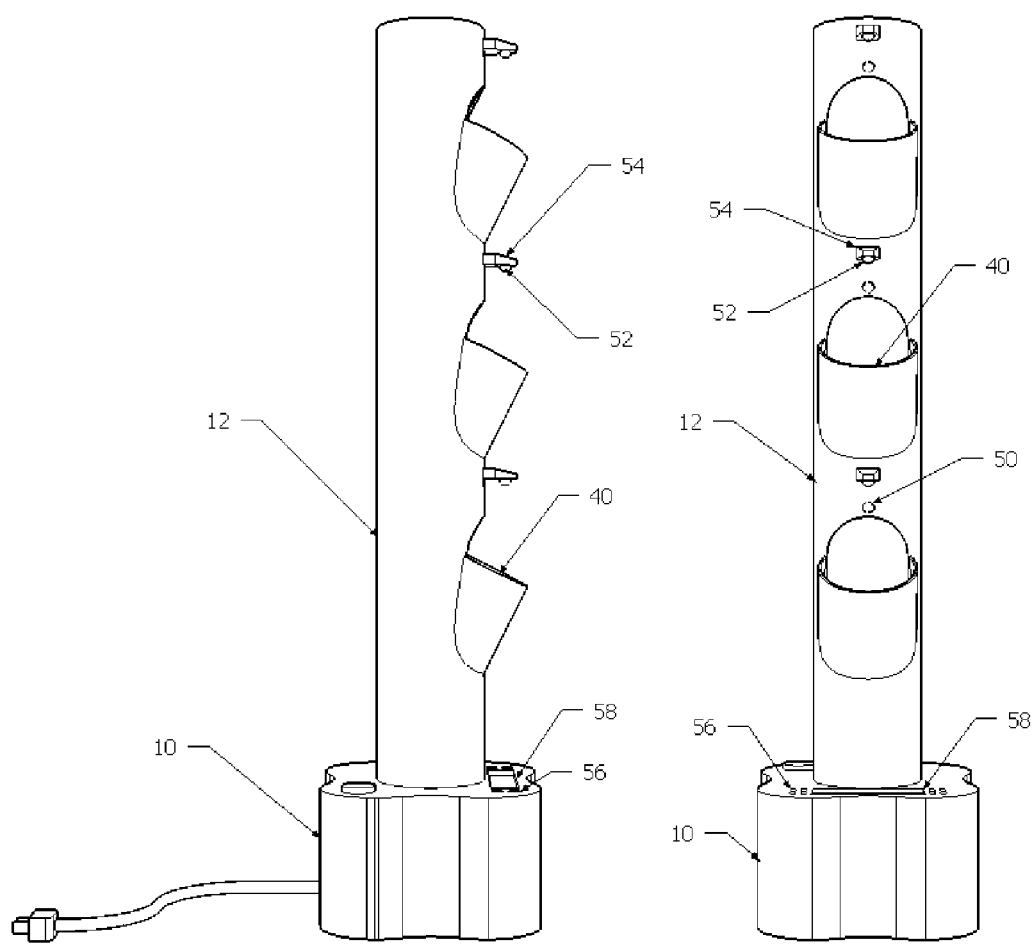

VERTICAL PLANTER

CROSS-REFERENCE TO RELATED APPLICATIONS

Not Applicable

STATEMENT REGARDING FEDERALLY SPONSORED RESEARCH OR DEVELOPMENT

Not Applicable

REFERENCE TO SEQUENCE LISTING, A TABLE, OR A COMPUTER PROGRAM LISTING COMPACT DISK APPENDIX

Not Applicable

BACKGROUND OF THE INVENTION

The present invention relates to the cultivation of plants. More particularly, the present invention relates to the cultivation and display of plants in a decorative planter into which a water and or nutrient-containing fog is in fluid communication with the base or root of a plurality of plants, or a planting medium.

The art of growing plants for decorative purposes has been practiced since ancient times. Countless inventions have been developed to solve many of the problems associated with growing and maintaining healthy plants, given the constraints that arise within a particular environment. The present invention intends to specifically target the issues of growing plants in urban or indoor environments where space and direct sunlight may be limited and the cleanliness, portability, maintainability, and visual appeal of both the plants and planter are important.

Previous self contained planter designs include U.S. Pat. No. 5,161,327, which discloses a planter made up of tubular sections, each containing a growing medium and an array of plants that can be artistically arranged while allowing fluid to pass from one section to the next. The tube sections are arranged horizontally and take up a considerable amount of space.

U.S. Pat. No. 7,171,782 discloses a planter made from a vertical tube in which multiple plants can be easily inserted or removed. Such vertically oriented structures conserve floor space and often include automatic watering systems to avoid the need to water each plant individually. In the invention disclosed in U.S. Pat. No. 5,555,676, fluids are pumped to the top of a planter and trickle down a planting medium. U.S. Pat. No. 5,276,997 discloses a planter with an improved irrigation system designed to keep fluids distributed evenly throughout a planter. However, such watering systems have the potential leak or clog. This problem is addressed in U.S. Pat. No. 7,516,574, which discloses an automatic watering planter that lacks any valves or moving parts.

Numerous inventions have improved the growing capabilities of vertical planters by employing hydroponic systems to provide nutrients to plants by immersing the roots in fluids rather than soil. Such hydroponic systems include U.S. Pat. No. 4,986,027, which discloses a vertical hydroponic planter, where plants are inserted into holes in the side of a tube and held in place by a soilless medium into which a nutrient fluid is introduced. This system, however, offers little versatility since it is difficult to replace parts or add plants once a planter is assembled.

U.S. Pat. No. 7,055,282. Discloses a hydroponic planter, made up of several stackable tubes allowing the addition or removal of planter sections, while U.S. Pat. No. 5,502,923 discloses another planter made up of stackable modules, each containing an array of plants in removable baskets so that individual plants can be added or removed as well as sections of the planter.

While hydroponic systems succeed in growing plants quickly the devices employed tend to be bulky and reduce the visual appeal of the planter and its ability to be artistically integrated within its surrounding environment. Additionally the tendency for fluid to flow downward due to gravity limits the orientations that such plants and planter modules can be arranged.

This problem can be resolved using an aeroponic system, in which a plant's roots are kept in a gaseous environment and nutrients are introduced as a spray or mist as disclosed in U.S. Pat. No. 4,332,105. This does not require the storage of fluids at the plant's roots allowing more freedom in the design of a vertical planter. Such systems are utilized in the inventions disclosed in U.S. Pat. Nos. 5,918,416, and 8,250,809. Both inventions, however, require liquid nutrients to be pumped to the top of a planter, which inhibits freedom of the planters design and has the potential leak or clog.

U.S. Pat. No. 5,136,804 discloses an aeroponic planter which uses an ultrasonic transducer to vaporize water directly from a reservoir eliminating the need for any liquid containing tubes. While the output of an ultrasonic humidifier varies depending on its surrounding, a planter with a built in stabilization method is disclosed in U.S. Pat. No. 5,937,575. The output of the humidifier can be further optimized to provide the ideal levels of moisture and nutrients specific to the plants being cultivated. Both inventions, however, include the recirculation of fluids, which require filtering to prevent the deterioration of the quality of the nutrient solution.

By supplying nutrients in vapor form, the design of a vertical planter is limited primarily by its ability to allow each plant enough light to survive. A planter designed to accommodate a built in light source is disclosed in U.S. Pat. No. 6,615,542. However, in this invention a central light source is provided and one or more planters are arranged around it. To allow more freedom in a planter's design, a planter structure could be constructed and then equipped with an array of light sources, each directed at a portion of the planter.

With the ability to keep a consistent flow of water and nutrients to an array of plant at the base or roots, as well as provide adequate light, the structure of a vertical planter and the location and orientation of plants within it can easily take on a much wider range of shapes and designs than those of the inventions listed above.

Therefore, it would be useful to provide a vertical planter in which water and nutrients are supplied, in vapor form, throughout a central structure into which plants can be inserted with light sources directed towards the plants.

BRIEF SUMMARY OF THE INVENTION

The present invention is a self contained tubular planter. At its base, the planter includes a fluid reservoir and an ultrasonic transducer, with which water or nutrient fluid is vaporized and directed into the inside of a generally hollow planter structure. Plants are placed in baskets or planting ports along the walls of the planter structure with roots facing towards the inside of the planter. Light sources may be mounted to the planter in such a way that the light is directed towards the plants.

Therefore a general object of the invention is to provide a planter capable of keeping an array of plants alive with minimal maintenance in a wide range of climates especially indoor or urban environments.

Another object of the invention is to provide a planter made up of modules that can be assembled to take on a large variety of shapes and sizes so that the planter can be artistically integrated into its surrounding environment and décor.

Still another object of the invention is to provide a planter in which light and nutrients provided to the plants can be monitored and optimized to keep plants alive using the least amount of energy and resources possible.

BRIEF DESCRIPTION OF THE SEVERAL VIEWS OF THE DRAWING

FIG. 2 is a side view of the vertical planter of FIG. 1;

FIG. 3 is a front view of the vertical planter of FIG. 1;

DETAILED DESCRIPTION OF THE INVENTION

Figure 1:
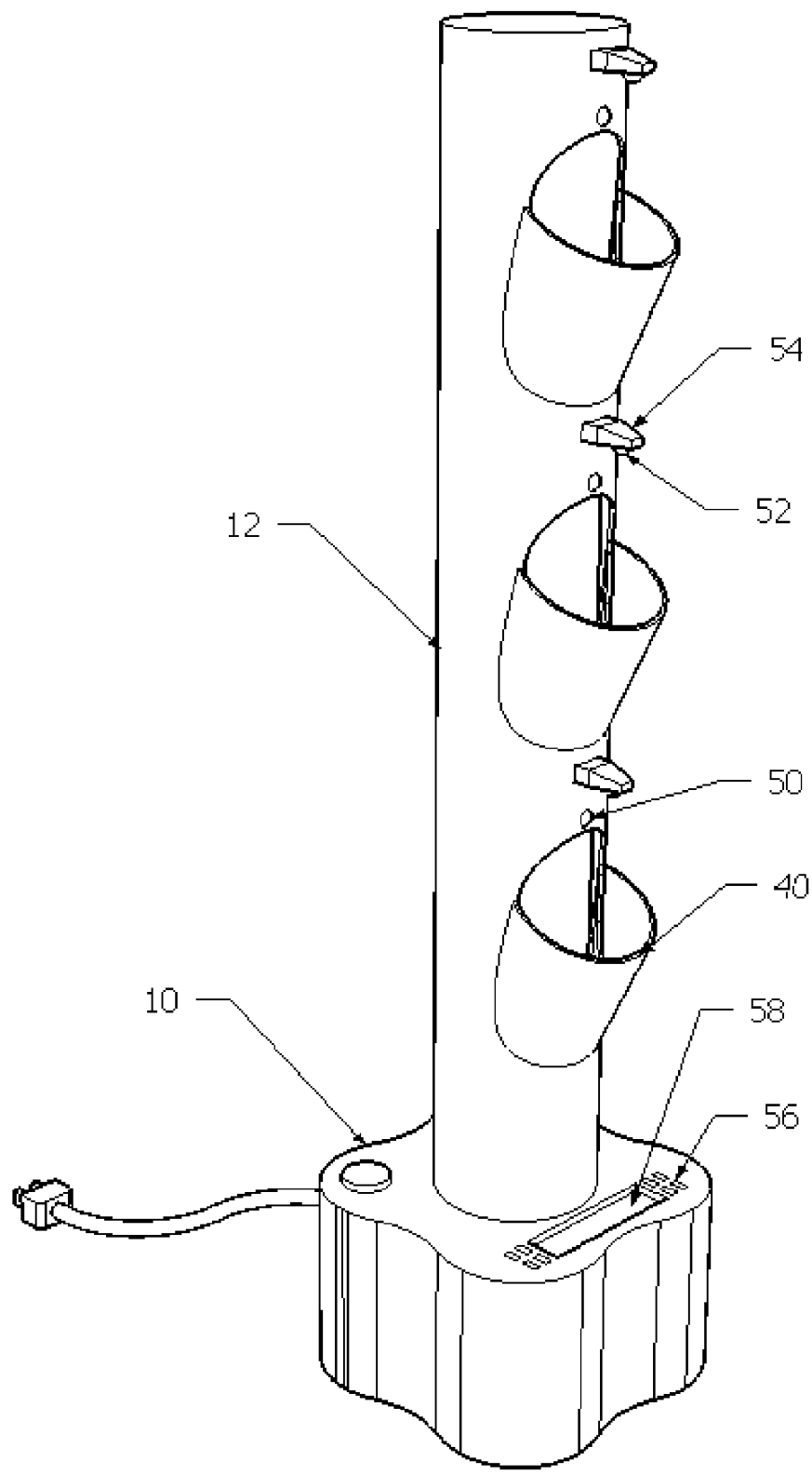
FIG. 1 is an isometric view of a vertical planter in accordance with certain preferred embodiments of the present invention.
Figure 4:
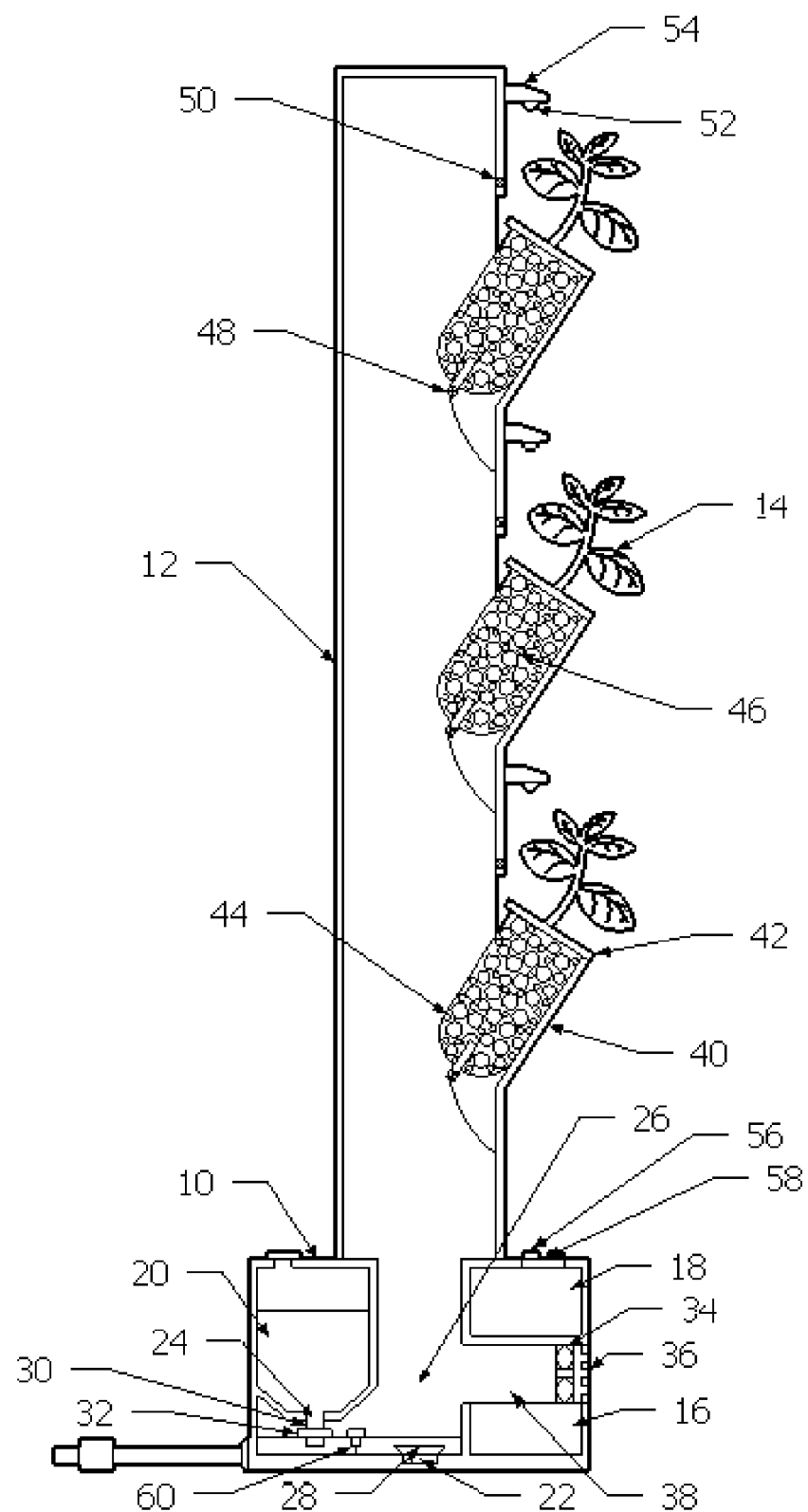
FIG. 4 is a cross-section side view of the vertical planter of FIG. 1 with plants included in the planter.
Figure 5:
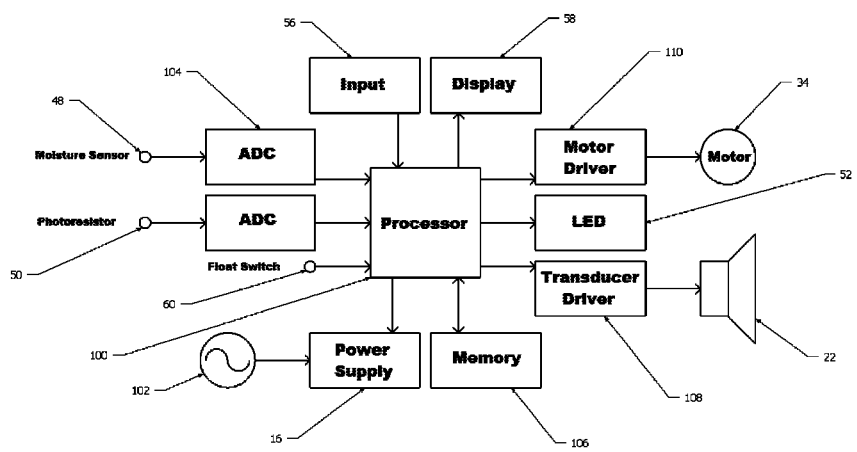
FIG. 5 is a block diagram of electronic circuitry of the vertical planter of FIG. 1 in accordance with certain preferred embodiments of the present invention.
Figure 6:
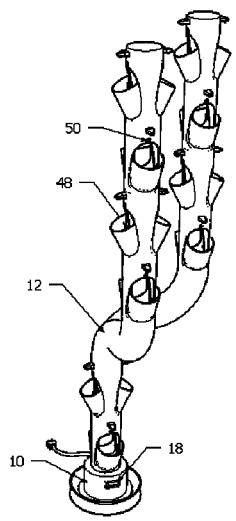
FIG. 6 and FIG. 7 are alternate versions of the vertical planter of FIG. 1.
Figure 7:
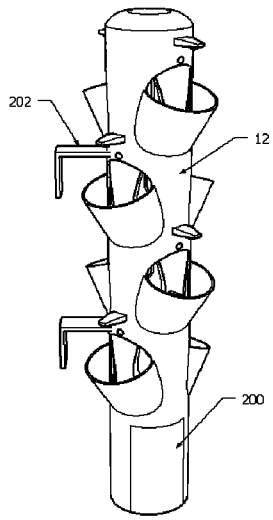

Referring now to the invention in more detail, in FIG. 1 to FIG. 4 there is shown a vertical planter comprising a base unit 10 containing a nutrient distribution system, and a hollow planter body 12 with openings for receiving plants 14. In the preferred embodiment of the invention, the base unit 10 includes a system for delivering a water or nutrient mist to the inside of the planter body 12 using an ultrasonic humidifier.

The humidifier comprises; a power supply 16, a control circuit 18, a fluid reservoir 20, and an ultrasonic transducer 22. Within the humidifier, water or nutrient solution, stored in the refillable reservoir 20, flows downward through a control valve 24 at the bottom of the reservoir 20 and into a fog chamber 26. An ultrasonic transducer 22 is secured to the floor of the fog chamber 26 such its vibrating diaphragm 28 is facing upward.

The control valve 24 comprises a vertical tube 30 with an opening on the side and a floatable cover 32 which slides vertically along the tube 30 so that it may completely block the opening on the tube 30 as is move upward, preventing the flow of fluid through the valve 24. The opening and cover 32 are positioned vertically so that fluid is allowed to flow into the fog chamber 26 until the diaphragm 28 of the transducer 22 is submerged by a thin layer, at which point the cover 32 floats high enough to block the opening on the tube 30. As fluid leaves the fog chamber 26, the cover 32 drops to allow more fluid from the reservoir 20 to enter until the fluid level is restored.

Still referring to the invention in FIG. 1 to FIG. 4, the base unit 10 includes a power supply 16 for providing electricity to a control circuit 18 that includes an adjustable transducer driver. When the transducer 22 is activated, its oscillations cause the fluid above it to break up into fine droplets which quickly evaporate to form a mist inside the fog chamber 26. The resulting mist is then circulated throughout the vertical planter by an air current, generated with an electric fan 34 driven by the control circuit 18 and programmed to run in conjunction with the transducer 22. The fan 34 is located against a vent 36 on the outside wall of the base unit 10 so that air from outside the planter is sucked through it and directed through a duct 38 and into the fog chamber 26 where it flows through the nutrient mist, carrying it out of the base unit 10 and into the interior of the planter body 12.

The planter body 12 consists of a rigid hollow structure with an array of openings or plant sockets 40 in which plant modules can be inserted. Each plant module includes a rigid outer ring 42 attached to the opening a vapor permeable pocket 44, which can be filled with a planting medium 46, in which seeds or plants 14 can be planted. Each plant module can be inserted into a socket 40 so that the pocket 44 portion hangs into the interior of the planter body and the outer ring 42 presses against the rim of the socket 40, securing it in place.

Some or all of the plant modules may be equipped with a moisture sensor 48 embedded within the planting medium 46 and electrically coupled to the control circuit 18. The control circuit 18 uses moisture readings to ensure that the humidifier is only active when the moisture content of the planting medium 46 falls below a tow threshold level.

Additionally, the outside of the planter body 12 may include an array of grow lights and photoresistors 50 to ensure that the plants 14 have adequate light to survive. Each lighting unit comprises an led 52 which may be mounted on the end of a lighting bracket 54 so that light is directed towards one or more plants 14. A series of photoresistors 50 may also be attached to the outside of the planter body 12 near each plant module and in the path of tight produced by the leds 52. The leds 52 and photoresistors 50 are electrically coupled to the control circuit 18, which is programmed to use readings from the photoresistors 50 to drive the leds 52 to produce enough light for the survival of the plants 14 within the planter.

In addition, still referring to FIG. 1 to FIG. 4, the base unit 10 may include a set of user controls 56, including buttons or knobs, and a display unit 58, electrically coupled to the control circuit 18, to adjust the output of the grow lights and vapor distribution system as well as display information gathered from the photoresistors 50 and moisture sensors 48. A float switch 60, located inside the fog chamber 26, signals the control circuit 18 when the reservoir 20 runs out of fluid, which is then indicated on the display unit 58.

Referring now to the invention in FIG. 5, there is shown a block diagram of the electronic circuitry of the preferred embodiment of a vertical planter. A central processor 100 uses information from an array of moisture sensors 48, photoresistors 50, and user controls 56, to drive a humidifier, lighting system and display unit 58. A power supply 16, including a plug for electrically connecting to an ac wall outlet 102, provides dc power to all other electronic circuitry.

In more detail still referring to the invention in FIG. 5, the processor 100 is programmed to determine when to activate the humidifier. Measurements from the moisture sensors 48 are read by an analog to digital converter 104 and compared to a threshold value stored in the processor's memory 106. If the humidifier is off, and the moisture reading is below a tow threshold value for a sufficient duration, then it is turned on. If the humidifier is on, and the moisture reading is above a high threshold value for a sufficient duration, then it is turned off. The high and low thresholds may be adjusted with the user controls 56. Information about moisture levels and threshold settings may be provided on the display unit 58, which preferably includes an led or lcd display.

When turning the humidifier on, the processor 100 sends a signal to activate a transducer driver 108 coupled to an ultrasonic transducer 22 for generating mist. The processor 100 is also programmed to signal a motor driver 110 to run electric fiat 34 as a means of generating an air current to disperse the mist when needed. A float switch 60, coupled to the processor 100, detects when the humidifier is low on fluid, which is then indicated on the display unit 58.

Additionally, processor 100 is programmed to run a series of teds 52 using feedback from the photoresistors 50. A minimum light value is stored in the processor's memory 106 and if any of the photoresistors 50 read a lower value, then the corresponding led 52 is illuminated until the minimum is reached. The processor 100 may be programmed to automatically update the minimum value periodically depending on the time of day or year. Both the minimum value and update characteristics may be adjusted with the user controls 56 with relevant information shown on the display unit 58.

In FIG. 6 there is shown an alternate version of the vertical planter of FIG. 1 to FIG. 4, in which the planter body 12 is made up of multiple substructures coupled to a single base unit 10. Through its array of photoresistors 50 and moisture sensors 48, the control circuit 18 automatically adjusts the level of light and nutrients needed to accommodate plant growth in a wide range of shapes and arrangement of the planter body 12 without any modifications to the base unit 10.

In FIG. 7 there is shown an additional alternate version of the vertical planter of FIG. 1 to FIG. 4, in which the base unit 10 is concealed inside of the planter body 12 with the user controls 56, display 58, and reservoir 20 each accessible beneath a removable panel 200. The planter includes mounting brackets 202 for wall mounting.

While the foregoing written description of the invention enables one of ordinary skill to make and use what is considered presently to be the best mode thereof, those of ordinary skill will understand and appreciate the existence of variations, combinations, and equivalents of the specific embodiment, method, and examples herein. The invention should therefore not be limited by the above described embodiment, method, and examples, but by all embodiments and methods within the scope and spirit of the invention.

I claim:

1. A vertical planter comprising:

a planter body having a hollow interior surrounded by an outer wall and at least one opening adapted to retain a plant container being formed in said wall;

one or more plant containers, each received by one of said at least one opening such that when inserted, at least a portion of said plant container depends into the interior of said planter body;

a fog generating means for generating a nutrient vapor in fluid communication with the interior of said planter body, wherein said fog generating means is an ultrasonic humidifier comprising a reservoir for holding a nutrient fluid, a fog chamber having a closed bottom and side walls located below said reservoir, an ultrasonic transducer secured to the bottom of said fog chamber, and a float valve for allowing said nutrient fluid to flow from said reservoir to said fog chamber until the fluid level reaches a desired height above said transducer;

a means of generating an air current within the interior of said planter body for pushing said nutrient vapor away from said fog generating means and towards said at least one opening in said planter body.

2. A vertical planter comprising:

a hollow planter body having a bottom, top, and one or more side walls wherein said one or more side walls include at least one major portion that is generally vertical;

a plurality of openings in said one or more side walls;

a plurality of plant baskets received by said plurality of openings;

a fog generating means for generating a nutrient vapor in fluid communication with the interior of said planter body;

a means of generating an air current within the interior of said planter body for pushing said nutrient vapor away from said fog generating means and towards said plurality of openings in said planter body, wherein said plurality of openings each include a protuberance extending outward away from said planter body and an indentation depending into the interior of said planter body, formed so that each opening has a circular perimeter with a rim that is mostly horizontal and angled away from said planter body.

3. A vertical planter comprising:

a hollow planter body having a bottom, top, and one or more side walls wherein said one or more side walls include at least one major portion that is generally vertical;

a plurality of openings in said one or more side walls;

a plurality of plant baskets received by said plurality of openings;

a fog generating means for generating a nutrient vapor in fluid communication with the interior of said planter body, wherein said fog generating means is an ultrasonic humidifier comprising a reservoir for holding a nutrient fluid, a fog chamber having a closed bottom and side walls located below said reservoir, an ultrasonic transducer secured to the bottom of said fog chamber, and a float valve for allowing said nutrient fluid to flow from said reservoir to said fog chamber until the fluid level reaches a desired height above said transducer;

a means of generating an air current within the interior of said planter body for pushing said nutrient vapor away from said fog generating means and towards said plurality of openings in said planter body.

4. A method for cultivating plants comprising;

preparing a plurality of plant containers with plants by filling each with a planting medium and inserting a plant with the root portion surrounded by said planting medium and the foliage extending out of said plant container;

distributing said plurality of plant containers throughout a support structure, comprising at least one outer wall surrounding a hollow interior, by embedding said plurality of plant containers within said at least one outer wall, such that the root portions of said plants in said plurality of plant containers protrude into the interior of said support structure and the foliage extends outside said support structure;

introducing a nutrient vapor into the interior of said support structure;

generating an air current passing through said nutrient vapor and then through said plurality of plant containers to distribute said vapor into said planting medium for watering said plants;

attaching a plurality of light sensors to the exterior of said support structure near said plants;

using a plurality of grow lights attached to said support structure to direct light to said plants when necessary as determined by said plurality of light sensors.

* * * * *